United States Patent [19]
Baumann

[11] 3,807,953
[45] Apr. 30, 1974

[54] METHOD OF DISPERSE DYEING AND CARRIER COMPOSITION THEREFOR

[75] Inventor: Hans-Peter Baumann, Munchenstein Basel, Switzerland

[73] Assignee: Sandoz Ltd., Basle, Switzerland

[22] Filed: May 23, 1972

[21] Appl. No.: 256,029

[30] Foreign Application Priority Data
May 28, 1971 Switzerland.......................... 7850/71

[52] U.S. Cl............................................. 8/175, 8/94
[51] Int. Cl........................... D06p 1/82, D06p 1/68
[58] Field of Search........................... 8/174, 175, 94

[56] References Cited
UNITED STATES PATENTS

| | | | |
|---|---|---|---|
| 3,706,530 | 12/1972 | Baumann et al.................... | 8/174 |
| 1,803,008 | 4/1931 | Ellis et al............................ | 8/175 X |
| 3,617,213 | 11/1971 | Britt..................................... | 8/175 |

*Primary Examiner*—Leon D. Rosdol
*Assistant Examiner*—T. J. Herbert, Jr.

[57] ABSTRACT

The present invention provides a method of dyeing with aqueous dispersed dyes which comprises using as dye carrier a composition comprising 30 to 60 parts by weight of diphenyl, 5 to 35 parts by weight of a phenyl toluene and 5 to 25 parts by weight of fluorene, provided the total of said parts by weight does not exceed 100.

The invention also provides a dye carrier composition as specified above and comprising also an emulsifier.

The invention is particularly useful in the dyeing of polyester fibres.

11 Claims, No Drawings

METHOD OF DISPERSE DYEING AND CARRIER COMPOSITION THEREFOR

The present invention relates to dye carriers for aqueous dispersion dyeing, especially of polyester fibres.

The use of carriers in aqueous disperse dyeing, particularly of polyesters, is well known. The amount of dye in the dyeing liquor or paste varies depending upon the actual dyes used, the material to be dyed and the shade desired. The carrier is normally used in large excess relative to the amount of dye (e.g., normally of the order of 10 times as much carrier as dyestuff).

The invention provides a method of dyeing with aqueous dispersed dyes which comprises using as dye carrier a composition comprising 30 to 60 parts by weight of diphenyl, 5 to 35 parts by weight of a phenyl toluene and 5 to 25 parts by weight of fluorene, provided the total of said parts by weight does not exceed 100.

The dye carrier composition may include other aromatic substances in an amount from about 1 to about 30 parts by weight, for example naphthalene, diphenyl ether, diphenyl methane, benzoic methyl ester, benzoic ethyl ester and/or tetrahydronaphthalene. These substances conveniently are known dye carriers.

At temperatures below about 25° to 40°C, these compositions are in the form of a white, partially crystalline solid, and are liquid above this temperature. Compared with the pure single compounds, their crystallization tendency is substantially lower and this is one of the advantages of the present invention in comparison with the dye carriers so far known, which are essentially pure compounds or mixtures of two essentially pure compounds. For example, carriers consisting of practically pure diphenyl can be added to the dyebath only at temperatures in the vicinity of 60°C or above, as otherwise crystalline precipitates are formed which lead to unlevel dyeings. Diphenyl sublimes readily from dyebaths containing practically pure diphenyl as sole carrier, the sublimate being deposited in crystalline form on the cold components of the machinery, which is not the case with the carriers of this invention.

Compositions which are useful as dye carriers according to this invention may be economically obtained as by-products from the industrial manufacture of aromatic compounds such as benzene, toluene, ethyl benzene or xylenes, for example from dealkylation reactions. They may, of course, also be prepared by admixture of the various components.

The compositions of the invention can be emulsified more easily in the dyebath, which greatly facilitates the production of level dyeings with optimum dye yield. The new carriers boil to 90 – 98% in the range of 200° to 290°C. They may be used for dyeing linear saturated aromatic polyester fibres in loose form, as tow, yarn, fabric and in other textile forms and are especially valuable for dyeing textured polyester yarns and fabrics. The carriers of this invention have no significant effect on the light fastness of the dyeings and prints produced with their aid.

Dyeing (which includes exhaust and pad dyeing and printing) using a carrier composition according to this invention is carried out in accordance with standard methods. The carrier may be added to the dyebath, padding liquor or printing paste at room temperature or above and is preferably in finely divided form preferably as an aqueous emulsion, or admixed with an emulsifier, and in an amount to give from 2 to 35% by weight on the substrate. Emulsions can be conveniently prepared with the aid of emulsifiers. Examples of suitable emulsifiers are adducts of ethylene oxide on alkyl phenols such as nonyl phenol and dodecyl phenol or on castor oil, and alkyl benzene sulphonates, dodecyl diphenyl ether disulphonate, neutralized sulphonates from the condensation products of phenol or naphthalene with formaldehyde, and mixtures of the aforenamed emulsifiers.

The emulsifier or emulsifier mixtures are suitably added to the carriers of this invention or to mixtures of these with known carriers in amounts generally ranging from 5 to 30 or preferably from 15 to 25 weight percent relative to the amount of carrier.

The preferred emulsifiers contain more than 60 weight percent, more especially from 80 to 95 weight percent, of an anionic dispersing agent and 5 to 15 weight percent of a non-ionic dispersing agent. In choosing the anionic dispersing agent for the emulsifier, preference is given to those which cause minimal foaming with the disclosed carrier mixtures in the dyeing process. Paraffin oil has a favourable effect on the emulsion stability and on the inhibition of foaming and is preferably included in the emulsifier. The suitable anionic emulsifiers include the sulphonates of castor oil, oleic ester, alkyl naphthalene, succinic diethyl hexyl ester, xylene and toluene. Examples of non-ionic dispersing agents are the ethers of fatty acids, aryl phenyl and alkyl phenyl polyglycols. Dispersing agents having more than 25–30 ethylene oxide units per molecule should not be present in the emulsifier mixture in amounts greater than 5 percent. Polyglycol ether derivatives with about 6 to 15 mols of added ethylene oxide groups, especially if they are partially carboxymethylated, sulphated or phosphated are conveniently used. Carboxymethylated polyglycol ether derivatives with more than 25 mols of ethylene oxide are comparable in their action to non-carboxymethylated emulsifiers with a similar ethylene oxide content.

The use of an emulsifier having high anionic activity is especially preferred with the active carrier substances according to this invention in order to produce heavy dyeings. If the emulsifier contains an unduly high percentage of non-ionic emulsifier, it is scarcely possible to dye deep blacks. If on the other hand the emulsifier is anion-active only such as the sulphonates, especially dodecyl benzene sulphonates, the dye tends to build up over-rapidly and the dyeings have poorer than normal rubbing fastness.

Accordingly, the invention also provides a carrier composition comprising 30 to 60 parts by weight of diphenyl, 5 to 35 parts by weight of a phenyl toluene and 5 to 25 parts by weight of fluorene, provided the total of said parts by weight does not exceed 100, and up to 30 parts by weight of other aromatic substances, and an emulsifier. Such carrier compositions are normally either added directly to the dyebath or printing paste or mixed with a suitable dye to form a ready-to-use dyeing preparation.

Although this invention is especially suitable for use in the dyeing of polyester fibres of high melting point, in particular textured goods, other hydrophobic synthetic fibres having a great number of ester groups in the molecule which normally show low dyeability, for example cellulose triacetate and linear polyurethanes, can often be dyed more easily and better with their aid.

The disclosed carriers are especially suitable for dyeing with disperse, vat and developing dyes. Alternatively they can be used to pretreat the goods before dyeing. The normal methods for dyeing and printing disperse dyes from aqueous dispersion are employed, exhaust dyeing at temperatures up to 140° being especially preferred. The dyes are invariably added to the medium in a state of fine division; after dyeing the loose surface colour can be removed by reduction clearing if necessary.

The following Examples illustrate the invention and the parts and percentages are by weight and the temperatures in degrees centigrade.

EXAMPLE 1:

A dyebath is set at 40° with 4,000 parts of water containing 2 g/l of anhydrous ammonium sulphate, 0.6 parts of a finely divided 50:50 mixture of the dyes of formulae

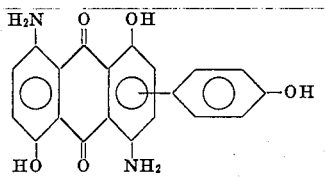

and

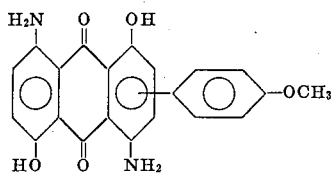

and 10 parts of the carrier-emulsifier mixture I of Example 2 described below, which is emulsified in the bath. The bath is adjusted to pH 5 with formic acid. 100 parts of a polyester fabric are immersed in the bath and the bath is raised to about 97° in 30 minutes and the fabric dyed at this temperature for about 1 hour. On removal it is washed off, rinsed and dried. A level, penetrated dyeing of blue shade is obtained which has excellent fastness properties.

Dyeings of comparable quality are obtained with the aid of the carrier-emulsifier mixtures II and III specified in Example 2.

Fast dyeings of excellent levelness are also obtainable with the dyes of the following formulae:

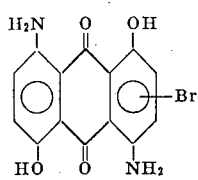 (B) blue

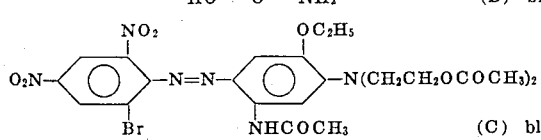

(C) blue (D) yellow

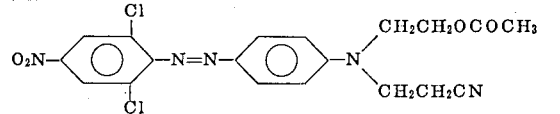

(E) yellow-brown

(F) scarlet

EXAMPLE 2

Carrier-Emulsifier Mixtures

I. 80% of a technical mixture of aromatic compounds obtained as a by-product in benzene manufacture and itself consisting of:
  33 % diphenyl
  25 % phenyl toluenes
  15 % fluorene
  27 % aromatic substances in small amounts (tetrahydronaphthalene, naphthalene, diphenyl ether, diphenyl methane, higher alkylated diphenyl, $C_8$ aromatic substances, anthracene, phenanthrene and other unidentified substances)
  5 % paraffin oil
  15 % monoethanolamine salt of dodecyl benzenesulphonic acid.

II. 57% of a technical mixture of aromatic compounds consisting of:
  60 % diphenyl
  15 % phenyl toluenes
  20 % fluorene
  5 % aromatic substances in small amounts as in I.
  10 % diphenyl ether
  10 % naphthalene
  5 % sodium dinonyl phenoxy- (45.ethoxy)-acetate
  1 % sodium dibutyl phenoxy-(7.ethoxy)-acetate
  7 % succinic acid diethyl hexyl ester sodium sulphonate
  5 % highly sulphonated castor oil containing about 80 % castor oil and about 18 % organically bound $SO_3$
  1 % isobutyl
  4 % paraffin oil III. 80 % of a technical mixture of aromatic compounds as in II
  10 % paraffin oil
  9 % of the adduct of 40 mols of ethylene oxide on castor oil
  1 % monoethanolamine salt of dodecyl benzenesulphonic acid.

The technical mixtures of I and II above are commercially available as by-products of the catalytic cracking and dealkylation manufacture of benzene from crude petroleum.

What is claimed is:

1. In the method of aqueous disperse dyeing using a carrier, the improvement comprising using a carrier comprising 30 to 60 parts by weight of diphenyl, 5 to 35 parts by weight of a phenyl toluene and 5 to 25 parts by weight of fluorene, provided the total of said parts by weight does not exceed 100.

2. The method of claim 1, wherein the carrier contains an emulsifier comprising from 80 to 95 weight % of an anionic dispersing agent and 5 to 15 weight % of a non-ionic dispersing agent, provided that the emulsifier comprises no more than 5% dispersing agents having more than 30 ethylene oxide units per molecule.

3. The method of claim 2 wherein the emulsifier contains a foam inhibiting amount of paraffin oil.

4. The method according to claim 2 wherein the emulsifier is a member of the group consisting of ethylene oxide-alkyl phenol and ethylene oxide-castor oil adducts; alkyl benzene sulphonates; dodecyl diphenyl ether disulphonate; sulphonated condensates of phenol or naphthalene with formaldehyde; sulphonates of castor oil, oleic ester, alkyl naphthalene, succinic diethyl hexyl ester, xylene or toluene; fatty acid ethers; and ethers of aryl phenyl and alkyl phenyl polyglycols.

5. The method according to claim 2 wherein the material dyed is polyester.

6. A composition comprising water, a dye dispersed in said water, and as carrier for said dye a mixture comprising 30 to 60 parts by weight of diphenyl, 5 to 35 parts by weight of a phenyl toluene and 5 to 25 parts by weight of fluorene, provided the total of said parts by weight does not exceed 100 and an emulsifier in an amount from 5 to 30 % by weight of the carrier, provided that the emulsifier comprises no more than 5% dispersing agents having more than 30 ethylene oxide units per molecule.

7. The composition according to claim 6 wherein the emulsifier is a member of the group consisting of ethylene oxide-alkyl phenol and ethylene oxide-castor oil adducts; alkyl benzene sulphonates; dodecyl diphenyl ether disulphonate; sulphonated condensates of phenol or naphthalene with formaldehyde; sulphonates of castor oil, oleic ester, alkyl naphthalene, succinic diethyl hexyl ester, xylene or toluene; fatty acid ethers; and ethers of aryl phenyl and alkyl phenyl polyglycols.

8. The composition of claim 6, wherein the carrier comprises also from 1 to 30 parts by weight of other aromatic substances selected from the group consisting of naphthalene, diphenyl ether, diphenyl methane, benzoic methyl ester, benzoic ethyl ester, tetrahydronaphthalene and mixtures thereof.

9. The composition of claim 8, in which the emulsifier comprises from 80 to 95 weight % of an anionic dispersing agent and 5 to 15 weight % of a non-ionic dispersing agent.

10. The composition of claim 9, comprising also paraffin oil as emulsion stabilizer and foam inhibitor.

11. The composition of claim 10, wherein the dye carrier comprises 80 weight % of a carrier mixture itself comprising about 30 weight % diphenyl, 25 weight % phenyl toluenes, about 15 weight % fluorene and about 25 weight % of other aromatic substances; about 5 weight % paraffin oil; and about 15 weight % of monoethanolamine salt of dodecyl benzenesulphonic acid.

* * * * *